United States Patent
Frauen et al.

(10) Patent No.: US 8,766,138 B2
(45) Date of Patent: Jul. 1, 2014

(54) METHOD FOR PRODUCING LARGE-SIZED SHELL SEGMENTS AS WELL AS SHELL SEGMENT

(75) Inventors: Holger Frauen, Hamburg (DE); Robert Alexander Goehlich, Hamburg (DE); Steffen Biesek, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 812 days.

(21) Appl. No.: 12/429,753

(22) Filed: Apr. 24, 2009

(65) Prior Publication Data
US 2009/0283509 A1 Nov. 19, 2009

Related U.S. Application Data
(60) Provisional application No. 61/127,384, filed on May 13, 2008.

(51) Int. Cl.
B23K 26/00 (2014.01)
(52) U.S. Cl.
USPC .............................. 219/121.85; 219/121.63
(58) Field of Classification Search
USPC ........ 219/121.85, 121.64, 121.63; 228/112.1; 244/117 R, 119
See application file for complete search history.

(56) References Cited

U.S. PATENT DOCUMENTS

| | | | | |
|---|---|---|---|---|
| 5,841,098 A * | 11/1998 | Gedrat et al. | ............ | 219/121.63 |
| 5,934,616 A * | 8/1999 | Reimers et al. | ............... | 244/119 |
| 6,364,250 B1 * | 4/2002 | Brinck et al. | .................. | 244/119 |
| 7,234,668 B2 * | 6/2007 | Wollaston et al. | ............ | 244/132 |
| 2005/0144874 A1 * | 7/2005 | West et al. | ....................... | 52/459 |
| 2006/0231682 A1 * | 10/2006 | Sarh | ............... | 244/119 |
| 2008/0210819 A1 * | 9/2008 | Jarsaillon et al. | ............. | 244/120 |

FOREIGN PATENT DOCUMENTS

| | | |
|---|---|---|
| DE | 19844035 | 11/1999 |
| DE | 19960909 | 6/2001 |
| DE | 102008001725 | 11/2009 |
| EP | 1081042 | 3/2001 |

OTHER PUBLICATIONS

English_machine translation of DE 1 081 042 A2 Mar. 2001.*
German Office Action for DE 10 2008 001 725.6 dated Apr. 21, 2010.

* cited by examiner

*Primary Examiner* — Sang Y Paik
(74) *Attorney, Agent, or Firm* — Jenkins, Wilson, Taylor & Hunt, P.A.

(57) ABSTRACT

The subject matter herein discloses a method for producing a fuselage section of an aircraft via large-sized, in particular long, shell segments. The method includes joining at least two skin segments to form a large-sized skin field, welding a plurality of integral stringers onto the skin field, and welding a plurality of integral and closed ring frames to the skin field.

6 Claims, 3 Drawing Sheets ns application claims the benefit of U.S. Provisional

METHOD FOR PRODUCING LARGE-SIZED SHELL SEGMENTS AS WELL AS SHELL SEGMENT

CROSS-REFERENCE TO RELATED APPLICATIONS

This application claims the benefit of U.S. Provisional Application No. 61/127,384, filed May 13, 2008, the entire disclosure of which is herein incorporated by reference.

FIELD OF THE INVENTION

The invention relates to a method for producing large-sized, in particular long, shell segments for forming a fuselage cell of an aircraft.

Further, the invention relates to a large-sized shell segment which is produced according to the method.

BACKGROUND OF THE INVENTION

The classical aluminum construction is still broadly applied in aircraft construction as is the aluminum composite construction. Herein fuselage sections are formed of at least two prefabricated (half) shell segments which are joined together while forming longitudinal seams. The individual prefabricated shell segments are formed with an outer skin that is curved once or twice and is stiffened on its inner side with stringers running in longitudinal direction of the aircraft and frames running transverse to this. The bonding of all these components is predominantly accomplished by a plurality of rivets. The production of the longitudinal seams between the shell segments to be joined together requires an overlapping of sufficient size between the outer skins of the shell segments to allow riveting. This overlapping provides a statically unnecessary doubling of the material thickness of the outer skin, thus increasing the weight.

The fuselage cell of an aircraft is formed of several prefabricated fuselage sections. For this purpose, at least two fuselage sections are joined together along a circumferential cross seam running transverse to the longitudinal axis of the aircraft. In the area of the cross seam, the outer skins of the fuselage sections are butt-joined such that for the riveting on the inner side transverse butt straps are necessary that extend from both sides of the cross seam. The stringers of each fuselage section that are facing each other in the area of the cross seam are coupled to each other by stringer couplers. In the area of the cross seam, additional connection corners (so-called "clips") are provided if necessary which are used for the connection and support of ring frames in the area of the cross seam. The connection corners may also be formed as integral portions of the stringer couplers. The transverse butt straps, the stringer couplers and the connection corners in the transverse butt area are not necessarily required to provide static stability, but they are indispensable for the creation of the riveting connections, so that unnecessary additional weight is added to the fuselage cell structure of the aircraft by these connection elements.

SUMMARY OF THE INVENTION

It is therefore an object of the invention to provide a method for producing shell segments for fuselage sections for aircrafts by which a weight reduction compared to the conventional construction method is achievable.

This object is achieved by a method that comprises the following process steps of claim 1:

a) Joining at least two skin segments to form a large-sized skin field,
b) welding a plurality of integral stringers onto the skin field, and
c) welding a plurality of integral ring frame segments to the skin field to finish the shell segment.

Due to the large length of the single shell segments according to the invention, the number of necessary connection elements for connecting the fuselage sections to a fuselage cell of an aircraft, in particular in the area of the cross seams, and at the same time the number of fuselage sections that are necessary for the formation of a fuselage cell are significantly reduced, whereby a high weight saving capacity is reached. Furthermore, the maintenance effort in service of the shell segment according to the invention is considerably reduced compared to the conventional riveting construction because corrosion effects as well as fatigue symptoms inside the welding seams do not appear or do only appear in a small extend compared to riveted seams. Moreover, due to the reduced number of cross seams the assembly effort of a fuselage section is reduced.

In process step a) the assembly of at least two skin segments to a large-sized skin field occurs. A length of the skin field, assembled in that way, is preferably considerable more than 12 m. Subsequently in process step b) a variety of integral, that means designed as one part, stringers is preferably welded, riveted or glued on the inner side of the large-sized skin field. Subsequently, in process step c) a variety of likewise preferably integral formed ring frame segments are preferably welded, riveted or glued to the skin field for completing the skin segments.

Weight increasing connection elements like stringer couplers, connection corners or transverse butt straps, for example, are no longer necessary for the stability of shell segments (so-called "long panel") manufactured in such a manner. A fuselage section for the later aircraft fuselage is here preferably formed with two large-sized shell segments, in particular shell segments with over length, in the so-called halve shell construction or with four shell segments in the four shell construction. A circumferentially different shell compartment with three, five or more shell segments is likewise possible.

The terms integral stringers, respectively integral formed ring frame segments denote in the context of the present application that the stringers as well as the ring frame segments are each provided as one piece, that means continuous, inside one shell segment. Hereby, connection elements for stringers as well as for ring frames are dispensable inside of one shell segment.

According to an advantageous advancement of the method it is designated that the at least two skin segments are joined by friction stir welding.

Friction stir welding enables the formation of a connection between two abutting aluminum alloy sheets butt to butt which is free of an overlap, wherein the mechanical properties of the welding seams are comparable to those of the basic material or, in the individual case, even better. Accordingly, can be proceeded with skin segments made of the basic material Glare® when in the intermediate jointing area for the longitudinal seam and/or cross seam connections that have to be formed a weldable aluminum alloy area is provided by a so-called splice-intersection to the basic material Glare®.

A further improvement of the method provides that the stringers and/or the ring frame segments are connected to the large-sized skin field by laser welding.

Laser welding enables a fast and above all a largely distortion-free fabrication of welding seams with a high performance between different aluminum alloy materials. Beyond that, devices for laser welding are generally designed compact and have a low weight, so that the welding of the integral stringers and/or the integral ring frame segments with the skin field can be accomplished by standard industrial robots, wherein the welding process can even be performed inside of an already circumferential closed fuselage section, if necessary.

According to another embodiment of the process, a fuselage section of an aircraft is formed with at least two shell segments and at least one floor frame, wherein the at least two shell segments are joined along longitudinal seams.

The longitudinal seams between the shell segments of a fuselage section can be fabricated in conventional manner by riveting, screwing or gluing so that an overlapping is necessary. Alternatively, it is possible to execute this longitudinal seams butt to butt by friction stir welding, that means without an overlapping.

Moreover, the object of the invention is achieved by a shell segment according to claim 7.

Thereby, that the large-sized skin field of the shell segment is formed by at least two skin segments, joined to each other by friction stir welding, wherein the large-sized skin field is stiffened on its inner side by a plurality of integral stringers and ring frame segments, which are welded on by laser welding and that it has a length of at least 12 m, the weight of a hereby assembled aircraft fuselage cell can be considerable reduced compared to the conventional aluminum construction because the number of necessary cross seams is overall reduced and at the same time only a reduced number of connection elements in the remaining cross seam areas is necessary. The shell elements according to the invention can have a length of up to 25 m.

BRIEF DESCRIPTION OF THE DRAWINGS

Further advantageous embodiments of the process and the shell segment are explained in the further claims.

In the drawings the same reference numbers denote the same constructional elements.

DETAILED DESCRIPTION OF THE DRAWINGS

Figure 1:
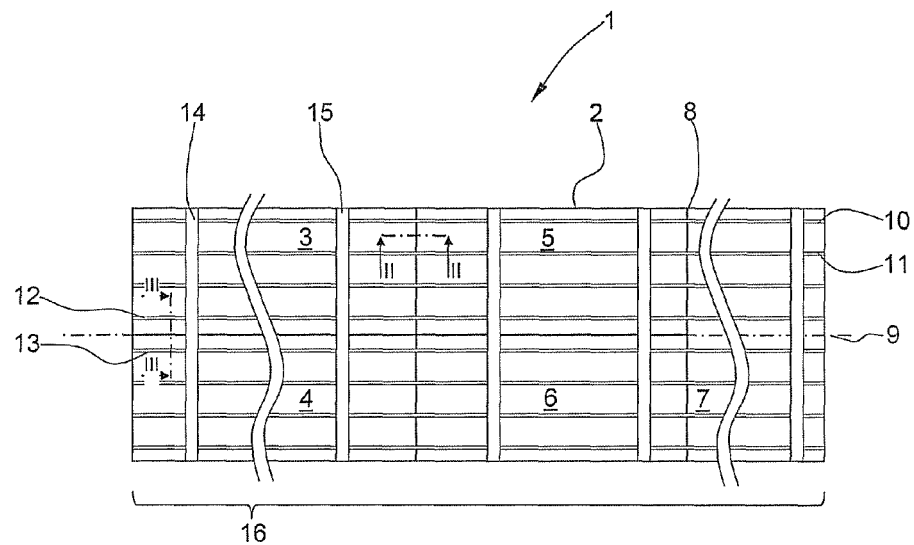
FIG. 1 is a simplified (plane) illustration of a top view on a shell segment according to the invention.

FIG. 1 shows a plan view of a shell segment according to the invention. A shell segment 1 is planked on its bottom side with a skin field 2. The skin field 2 of the embodiment shown in FIG. 1 is provided with a total of five, approximately rectangular, skin segments 3 to 7 (skin sheets). The five skin segments 3 to 7, which are made of an aluminum alloy material are connected to each other by a plurality of friction stir welding seams of which one friction stir welding seam 8, representative for the remaining ones, is provided with a reference numeral. By the application of the friction stir welding process, it is ensured that the skin field 2, which is welded from the skin segments 3 to 7, has the same mechanical properties as when the skin field 2 would have been formed of a homogeneous aluminum alloy sheet made of one piece. Moreover, the skin field 2 can be produced in nearly any size, which can be chosen completely independent of the normally used standard aluminum alloy sheets, which are provided on so-called "Coils", and/or Glare® semi finished products.

A longitudinal axis 9 of the shell segment 1 extends essentially parallel to the longitudinal axis of an aircraft not shown in the drawings. Welded into the skin field 2 is a plurality of continuous, coupler free stringers each made in one piece, of which four stringers 10, 11 and 12, 13, representative for all furthers, are provided with reference numerals. The welding of the stringers on the skin field 2 at least in regions is preferably done by a known laser beam welding process. Preferably, the stringers are spaced apart equidistantly and are arranged on the skin field 2 parallel to the longitudinal axis 9. The stringers can be formed as oblong, preferably seamlessly extruded beams (for example T-stringer, Z-stringer or Ω-stringer). Alternatively, the stringers can be made of shorter beams, jointed butt to butt, in particular by thermal jointing processes.

Transverse to the stringers and the longitudinal axis 9 a plurality of integral (this means consisting of one part and formed without couplers) ring frame segments of which two ring frame segments 14, 15, representing all others of the shell segment 1 are provided with reference numerals are welded at least in sections on the skin field 2. Also the ring frame segments 14, 15 are—like the stringer profiles too—preferably welded by laser beam welding to the skin field 2. The laser beam welding seams in the area of the stringers and the ring frame segments are not depicted in the illustration of FIG. 1.

The shell segment 1 for the actual use is, contrary to the illustration of FIG. 1, not plane but curved at least in sections at least uniaxially or biaxially (spherical), to fit seamlessly into a circumferential contour of a fuselage cell of an aircraft with generally spatially variable radii of curvature. Both the skin segments 3 to 7 and the stringers as well as the ring frame segments are composed of a suitable aluminum alloy material. A length 16 of the shell segment 1 is greater than 12 m.

Figure 2:
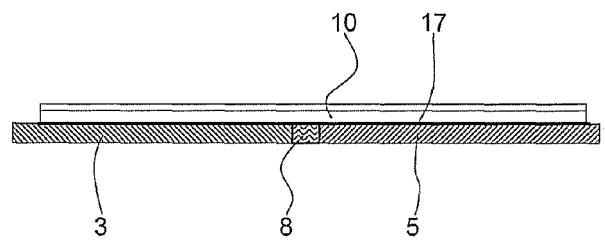
FIG. 2 is a sectional illustration along the intersection line II-II in FIG. 1.

FIG. 2 shows a sectional view along the section line II-II in FIG. 1.

The skin segment 3 is connected to the skin segment 5 by means of the friction stir welding seam 8. The stringer 10, which is connected to both of the skin segments 3, 5 as well as to the friction stir welding seam 8 by means of a laser welding seam 17, is arranged above the skin segments 3, 5.

Figure 3:
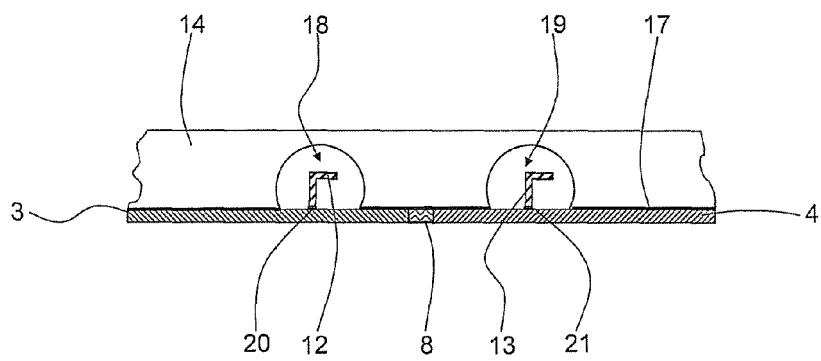
FIG. 3 is a sectional illustration along the intersection line III-III in FIG. 1, FIG. 4-6 are schematic illustrations of the method workflow.

FIG. 3 shows a sectional view along the section line III-III in FIG. 1.

The two skin segments 3, 4 are connected to each other butt to butt by the friction stir welding seam 8. The left-side ring frame segment 14, which is connected to the skin segments 3, 4, by means of a laser welding seam 17, which is at least formed in sections, is arranged above the skin segments 3, 4. Moreover, two recesses 18, 19 are provided in the ring frame 14 through which the two stringers 12, 13 are guided which run at a right angle to the ring frame segment 14. The stringers 12, 13 are likewise jointed to the skin segments 3, 4 by two laser welding seams 20, 21, which are formed at least in sections.

Figure 4:
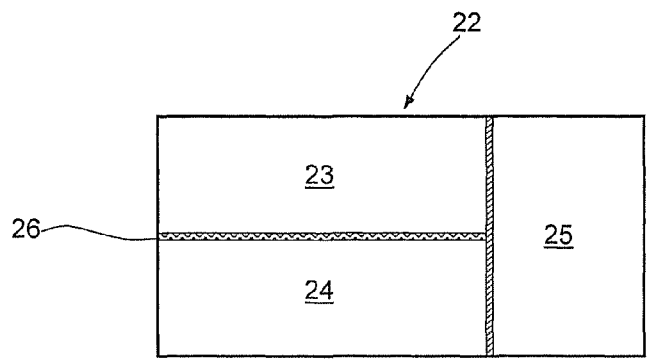
Figure 5:
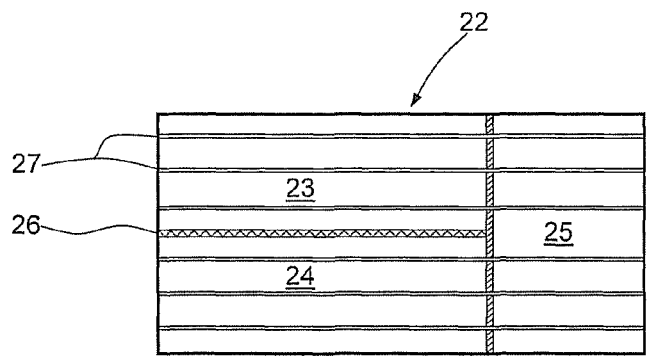
Figure 6:
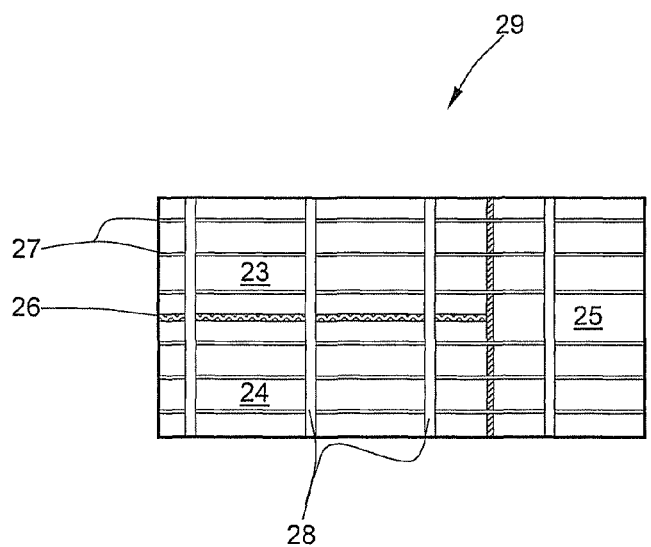

The FIGS. 4 to 6 schematically illustrate the flow of the process, according to the invention.

In a first process step a) a skin field 22 with three skin segments 23 to 25 is formed which are connected to each other butt to butt by means of a friction stir welding seam 26. In process step b), a plurality of preferably integrally formed stringers of which merely two stringers are provided with the reference sign 27 are welded on the skin field 22 by laser welding. In the last and third process step c), a plurality of ring frame segments, of which likewise just two ring frame segments 28 representing the remaining ones are provided with a reference sign, are welded on the skin field 22 by laser welding to form a finished shell segment 29 (so-called "long panel") for the production of a "long" fuselage section.

Alternatively it is possible, to weld complete, that means for example closed, circular ring-shaped, integral ring frames, on the skin field 22, which is in this case preferably arranged beneath. Subsequently, a necessary number of uniform shell segments with stringers welded on them in advance, but still without ring frame segments is applied closing to each other circumferentially from the outside on the ring frame segments. All connections between the shell segments on the one hand and between the shell segments and the ring frame on the other hand can be produced by gluing, riveting, screwing, thermal joining techniques or any combination thereof.

Figure 7:
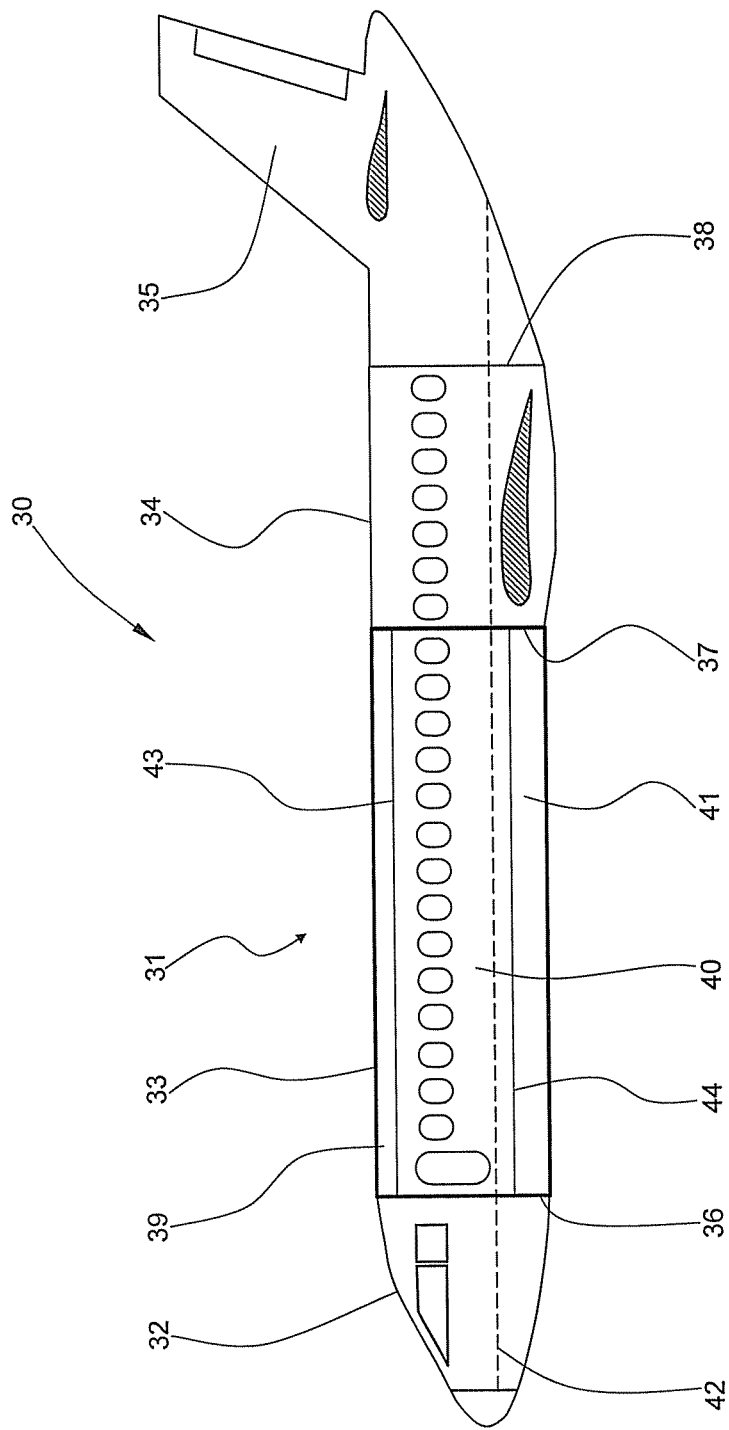
FIG. 7 is an in principle illustration of an aircraft produced using the shell segments ("long panel") according to the invention.

FIG. 7 shows a diagrammatical but not true to scale view of an aircraft which is produced by means of the shell segments ("long panels") according to the invention.

An aircraft 30 has a fuselage cell 31 which in the shown embodiment is formed with a cockpit section 32, a "long" fuselage section 33, a wing box section 34 and a rear section 35. All sections are connected to each other by cross seams 36 to 38. The fuselage section 33 is formed with "long" shell segments according to the invention, of which shell segments 39 to 41 are visible, while a further shell segment is hidden. Moreover, a floor frame 42, which is illustrated in the view of FIG. 7 with a dashed line, runs trough all sections. The shell segments 39 to 41 are connected to each other by the longitudinal seams 43, 44.

The cross seams 36 to 38 as well as the longitudinal seams 43, 44 are preferably produced in a conventional manner, for example with riveting connections, screws, gluing connections or an any combination thereof, so that, in this case, overlapping areas are necessary for the formation of the connection. Alternatively, it is possible to produce at least the longitudinal seams 43, 44 and, if necessary, the cross seams between the shell segments 39 to 41 in the area of the middle fuselage section 33 by friction stir welding and/or laser welding to further reduce the number of necessary overlapping areas and riveting connections, whereby at the same time the cost of sealing and corrosion protection is reduced.

Since the shell segments 39 to 41 and the further hidden (rearmost) shell segment which is not provided with reference numerals, which are used to produce the middle fuselage section 33, have, in accordance with the invention, a large dimension of preferably at least 12 m each in longitudinal direction, the number of necessary cross seams 36 to 38 inside of the fuselage cell 31 is reduced in comparison with conventional aluminum sectional constructions and thus also the number of weight increasing overlapping areas which do not have a necessarily required static function is reduced.

Due to the forced application of the known friction stir welding process it is possible to form the shell segments 39 to 41 by butt joints to assemble "long" fuselage sections such that the hitherto necessary overlap seams and the weight increase and sealing problems resulting from that are omitted.

Furthermore, the method permits a general independence of the standard sizes of the used aluminum sheets, which are nowadays provided on standardized "coils". The feasible lengths of the later shell segments 39 to 41 are, in the case of an at least partially mixed construction with aluminum alloy sheets and with Glare®-half-finished products, limited only by the dimensions of the autoclaves that are available. Regardless of that, the available technical equipment (for example applicators, bathes etc.) can be continued to be used for the production of the shell segments or the skin fields. Due to the combination of friction stir welding technology with laser welding technology, it is possible to produce shell segments with large sizes (>12 m) for large component assembly.

Furthermore, the method according to the invention simplifies the production progress since stringers and frames can be positioned and (pre-) assembled easier as integral parts and there are no overlapping areas with different tolerance characteristics. Further, the application of the frames and the stringers on the long shell segments can be carried out in an effective manner by means of the preferable application of the laser welding process. Considerable weight reductions of the shell segments 39 to 41 and reduced cycle times are achieved.

Additional coupler elements can be largely omitted. In the case of the application of the integral construction to frames in circumferential direction and stringers in longitudinal direction beyond the limiting size of the half finished products, it is possible to prefabricate the mentioned parts with the same geometrical dimensions like the "long" shell segments. The stringers and the frame (segments) to the large-sized skin field are preferably applied by known laser welding processes, which are more productive than the conventional riveting process. Due to the application of the laser welding process to shell segments 39 to 41 with a typical length of more than 12 m, the specific advantages of this modern joining technology have an optimal effect.

The efficient production of the long shell segments 39 to 41 by means of the process according to the invention reduces the number of the otherwise necessary interfaces in the longitudinal direction and in the cross direction to the indispensable minimum for a large component assembly of a fuselage section, wherein the fuselage section preferably is formed with two, three or four shell segments (so-called 2-part, 3-part or 4-part shell partition). The process explained above is the basis of the future concept of the "integrated fuselage section and fuselage cell assembly", which abolishes the separation between construction and manufacturing of fuselage section assembly and fuselage cell assembly.

The invention claimed is:

1. Method for producing a fuselage section of an aircraft via large-sized, in particular long, shell segments, comprising the following steps:
   a) joining at least two skin segments in a longitudinal direction and up to two skin segments in a transverse direction to form a large-sized skin field, wherein the length of the skin field in the longitudinal direction is at least 12 m,
   b) welding a plurality of integral stringers onto the skin field for forming a first large-sized skin field, and
   c) welding a plurality of circular ring-shaped integral and closed ring frames to the skin field to finish a second large-sized skin field; and
   d) forming the fuselage section from a number of first large-sized skin fields by applying closing to each other circumferentially on the second large-sized skin field.

2. Method according to claim 1, wherein the at least two skin segments are joined by friction stir welding to form the large-sized skin field.

3. Method according to claim 1, wherein the stringers and the ring frame segments are connected to the large-sized skin field by laser welding.

4. Method according to claim 1, wherein a fuselage section of an aircraft is formed with at least two shell segments and at least one floor frame, wherein the at least two shell segments are joined by at least two longitudinal seams.

5. Method according to claim 1, wherein the joining of the fuselage section with the at least two shell segments is carried out, in particular, by welding, riveting, screwing, gluing or any combination thereof.

6. Method according to claim 1, wherein a fuselage cell of an aircraft is carried out by the joining of at least one fuselage section with one cockpit section, one wing box section and one rear section, forming at least two cross seams.

\* \* \* \* \*